United States Patent
Oliver

(10) Patent No.: US 6,647,703 B2
(45) Date of Patent: Nov. 18, 2003

(54) MODULAR UNIT FOR MOUNTING ON A GRASS TREATMENT MACHINE

(75) Inventor: Marcus Oliver, Adel (GB)

(73) Assignee: Greensward Engineering Co. (GB)

( * ) Notice: Subject to any disclaimer, the term of this patent is extended or adjusted under 35 U.S.C. 154(b) by 0 days.

(21) Appl. No.: 09/936,368

(22) PCT Filed: Jan. 15, 2001

(86) PCT No.: PCT/GB01/00137

§ 371 (c)(1),
(2), (4) Date: Sep. 13, 2001

(87) PCT Pub. No.: WO01/50837

PCT Pub. Date: Jul. 19, 2001

(65) Prior Publication Data

US 2002/0157367 A1 Oct. 31, 2002

(30) Foreign Application Priority Data

Jan. 14, 2000 (GB) .............................................. 0000790

(51) Int. Cl.⁷ ............................................... A01D 34/44
(52) U.S. Cl. ............................................................ 56/2
(58) Field of Search ........................ 56/6, 7, 16.7, 16.9, 56/175, 2, 1; 172/1, 41, 42, 48, 49, 125, 156, 142, 176

(56) References Cited

U.S. PATENT DOCUMENTS

| 2,509,993 A | 5/1950 | Soss | |
| 3,603,162 A | * 9/1971 | Gohler | 74/16 |
| 3,783,592 A | 1/1974 | Schraut | 56/13.3 |
| 5,224,552 A | * 7/1993 | Lee et al. | 172/52 |
| 5,261,213 A | 11/1993 | Humphrey | 56/2 |
| 5,520,253 A | * 5/1996 | Kesting | 172/125 |

FOREIGN PATENT DOCUMENTS

GB 2337914 8/1999

* cited by examiner

Primary Examiner—Robert E. Pezzuto
(74) Attorney, Agent, or Firm—Madson & Metcalf

(57) ABSTRACT

A modular unit for mounting on at least two different designs of self-propelled grass treatment machine, each machine having a number of mounting locations for mounting respective modular units and in which the mounting locations of one machine are different in type or design from the mounting locations on the other machine The modular unit contains a frame having end frame plates spaced apart from each other transversely with respect to the direction of forward travel of the machine; rotatable mountings provided on the end frame plates; a rotatable grass-treatment device having a drive shaft extending between the rotatable mountings, and provided with working elements arranged along its length; a device for applying drive to the shaft; and mounting points provided on the frame of the modular unit to accept at least two different types and/or arrangements of fitting brackets that permit the modular unit to be mounted on the grass treatment machines.

20 Claims, 10 Drawing Sheets

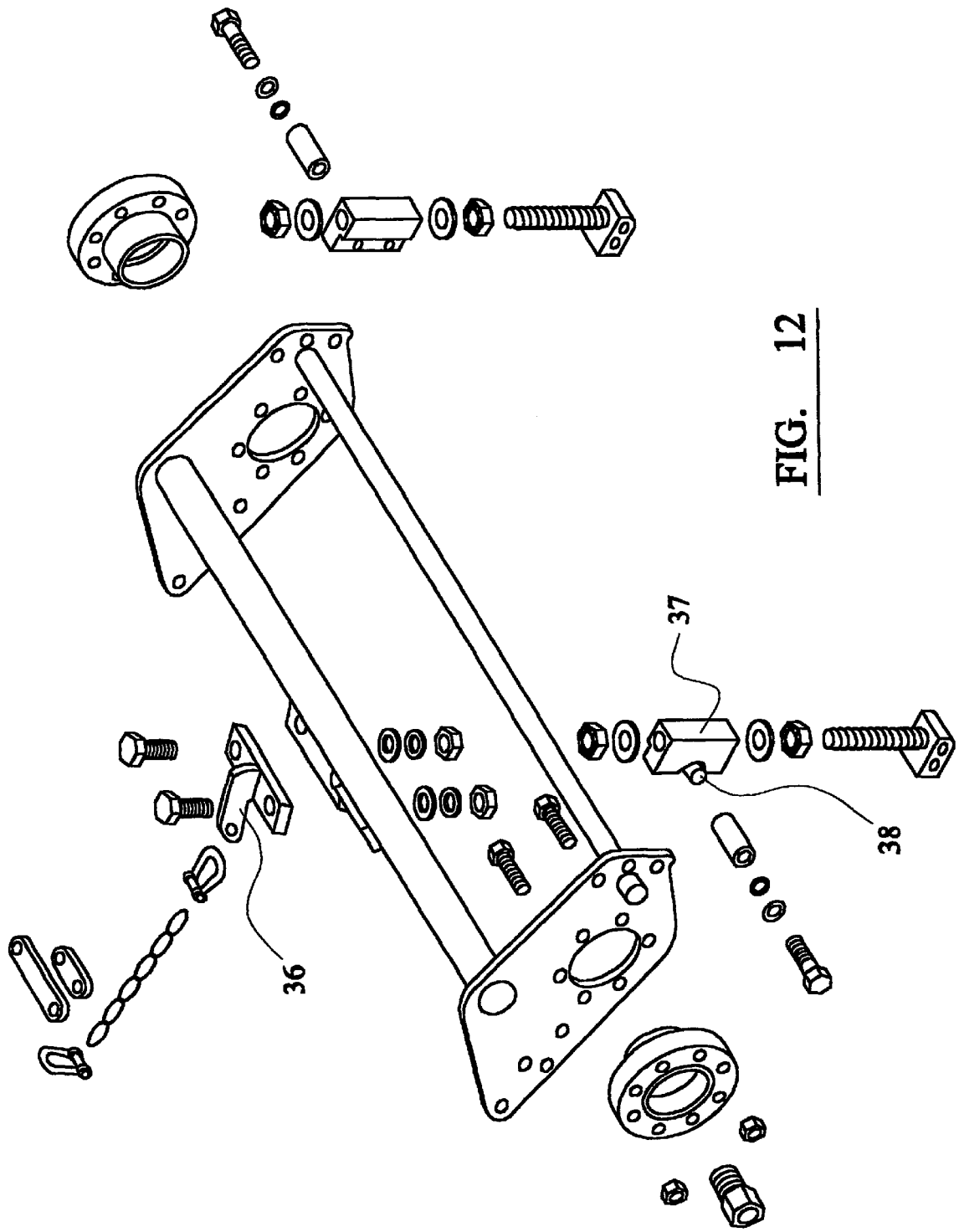

MODULAR UNIT FOR MOUNTING ON A GRASS TREATMENT MACHINE

BACKGROUND OF THE INVENTION

This invention relates to a modular unit for mounting on self-propelled grass treatment machine.

The invention is particularly applicable to grass treatment machines of the type designed for large scale use e.g. in the treatment of fairways, tees, and greens of a golf course, and which usually have a number of separate grass treatment units mounted thereon, so that a large area of grass can be "treated" during each pass of the machine.

Examples of such machine include so-called "triple mowers", in which three separate mowing units are mounted on the frame of the machine, spaced apart sideways from each other with respect to the mowing direction, and usually with two forward units in a front row and spaced apart from each other, and a single following unit arranged to work on the grass in the space between the two forward units.

Other types of grass treatment units or "modules" which can be provided on the machine include "thatch" removal units, spiking units to aerate the turf, and brushing units.

There are a number of major manufacturers of self-propelled grass treatment machines, which usually have a ride-on facility, and which also include a main frame or chassis on which the various required grass treatment units can be mounted. Frequently, the units are suspended from suitable suspension mountings on the frame of the machine, and which allow the units to rock relative to the mountings in order to follow any possible variation in the contour of the ground over which the unit is travelling.

It is a fact that different manufacturers have different types of mountings, and/or locations on their frames, to which various grass treatment modular units (e.g. a mower unit) can be coupled. These manufacturers may supply their own unique design of units for use with their overall machines, but this necessarily ties in a potential purchaser of the overall machine to purchase the units initially with the machine, and also to purchase any spare parts/replacement units from the same manufacturer in the future.

Large scale users of grass treatment machines e.g. golf course operators, may have a number of grass treatment machines, and unless there is a policy only to purchase from one manufacturer of the machines, (and particularly perhaps only one model from one particular manufacturer), it is quite common for one operator to have a number of quite different designs of grass treatment machines, e.g. from different manufacturers, and often of different ages, each requiring their own dedicated range of attachments.

One typical type (A) of grass treatment machine to which the invention may be applied is shown in the perspective illustration in FIG. 1 of the accompanying drawings. FIG. 2 is an exploded illustration showing how one of the cutting units is detachably mounted on the main frame or chassis of the known type of machine A.

The grass treatment machine A has all of its cutting units C driven by a hydraulic motor 1 fitted to the right hand end (viewed from the operator's seat) of each unit. Later models from the same manufacturer have two units driven from the right hand end, and one from the left. The cutting units from older and newer models will not interchange.

All manufacturers of "greens" triple mowers have their own unique methods of attaching their cutting units to the main frames of their machines. In machine A, as shown in FIG. 2, an inverted U-shape lifting hoop 2 of the unit is supported by lifting arm 3 provided on the main frame of the machine A. A pair of pull arms 4 are also provided which connect via couplers 5 to a pair of ball connectors 6. The hydraulic drive motor 1 is attached by a pair of threaded studs with securing nuts 7.

A further typical grass treatment machine to which the invention may be applied is shown in FIG. 3, and designated machine B. This machine has hydraulic motors 8 which all drive from the left hand end of each unit. These motors are attached to the units by a single quick release pin 9. In a previous model (not illustrated), two units are driven from the left hand end and one unit driven from the right, with hydraulic motors which may be attached by either two or four threaded studs with nuts, depending on the age of the machine.

Machine B also has its own way of attaching the cutting units C' to the main frame of the machine, by using an intermediate pull-frame 10 which attaches to the cutting unit with bolts at points 11.

Thus, it may be seen from the above examples of existing machines A, B, taken from just two of the four main brands of "green" triple mowers, that a wide variety of methods of attachment are used, even by the same manufacturer within its own range of machines, which has caused substantial problems for many years, particularly to those who own more than one type of machine.

There is a clear customer need to enable the purchaser of grass treatment machines as original equipment to obtain the units or "modules" for use with any particular machine from other sources, both as original equipment, but also for replacement of worn parts and modules.

However, this is not available at present, in that different machine manufacturers have different locations and modes of mounting the units on the frame. There is a need to provide a "universal" design of unit which is readily capable of being mounted on the frames of grass treatment machines of different design and ages e.g. sourced from different manufacturers.

Furthermore, if such a "universal" unit were able to house a range of interchangeable mechanisms which could be fitted into the same basic unit chassis, this would be of great benefit to the owners of such equipment as it would save the expense of purchasing complete sets of units for each function, for each type of grass treatment machine, and also save the storage space needed for all these sets of units. The space that would then be needed would be only that which is sufficient for one set of unit chassis and the extra sets of mechanisms required.

BRIEF SUMMARY OF THE INVENTION

According to the invention there is provided a modular unit for mounting on at least two different designs of self-propelled grass treatment machine, each machine having a main frame provided with a number of mounting locations for mounting respective modular units and in which the mounting locations of one machine are different in type or design from the mounting locations on the other machine, and in which the modular unit is operative to carry out a required grass treatment action when mounted in position and which comprises:

a frame having end frame plates spaced apart from each other transversely with respect to the direction of forward travel of the machine;

mountings provided on the end frame plates;

a rotatable grass-treatment device having a drive shaft extending between said mountings, and provided with working elements arranged along its length;

means for applying drive to said shaft; and at least one mounting point provided on the frame of the modular unit to accept a one of a plurality of different types and/or arrangements of fitting bracket that will permit the modular unit to be mounted on said at least two different designs of grass treatment machines.

Therefore, a potential purchaser of a self-propelled grass treatment machine from one manufacturer can readily source the modular units for use therewith from a different source e.g. a specialist manufacturer of "universal" designs of modular unit. This will give greater flexibility to the purchaser, who will be able to use the same modular units on a number of different types of self-propelled grass treatment machine which may be currently used.

The or each mounting point provided on the frame of the modular unit is/are preferably arranged along a support. The support can be a transversely extending support. The support can be a part of the frame. A single type and/or arrangement of mounting bracket can be provided for use with different types of self-propelled grass treatment machine. The same and/or different types and/or arrangements of mounting brackets can be provided for use with different types of self-propelled grass treatment machine. These mounting points can be formed simply by fitting plates or brackets, provided with suitable mounting holes.

Preferably at least two mounting points are provided. The mounting points are preferably positioned at different positions along the support arm.

The mounting points can be provided on the frame of the unit arranged along a transversely extending support arm of the frame, and having different types and/or arrangements of mounting brackets arranged along its length, and each designed specifically for use with a particular different type of self-propelled grass treatment machine.

An additional adapter kit may be provided with each modular unit according to the invention, to allow adaptation to suit still further different types of grass treatment machine.

The end frame plates carrying the rotatable mountings preferably have a mounting flange provided on at least one of the end plates, to allow a suitable drive unit to be coupled therewith e.g. a proprietary hydraulic motor specific to a particular grass treatment machine manufacturer. A "universal" mounting flange may therefore be provided on at least one of the end frame plates for this purpose.

The modular unit according to the invention will be designed to be capable of carrying out any required grass treatment action e.g. mowing, removal of thatch, brushing or spiking. Evidently, the specific type of rotatable grass treatment device provided for the modular unit will be provided with the particular end use in mind.

Therefore, the present invention provides a totally new concept of a "universal" modular unit, which is designed to fit all common makes of greens "triple mowers", by simply exchanging various fitting brackets to suit.

Furthermore, the working mechanism of the unit is itself removable from the chassis, to enable a different type of mechanism to be fitted in its place. Thus, a mowing unit may become a verticutter or brush etc.

The result is a vastly more flexible system than presently available, which will not only save operators money and storage space in the short term, but also save them from having surplus obsolete attachments left over when the main power unit is replaced in the future.

A modular unit according to the invention may have a front mounted transversely extending roller, and the mounting of the roller may be obtained by provision of different front roller mounting brackets, incorporating different fittings required for various makes/models.

BRIEF SUMMARY OF THE DRAWINGS

FIG. 12 is an exploded perspective view of a modular unit for mounting on a grass treatment machine that uses a lifting bracket fitted on the frame mounting arm and a different design of front roller height adjusting bracket.

DETAILED DESCRIPTION OF THE INVENTION

A preferred embodiment of modular unit according to FIGS. 4 and 5 of the invention will be described in detail, by way of example only, with reference to the accompanying perspective illustration.

Figure 5:
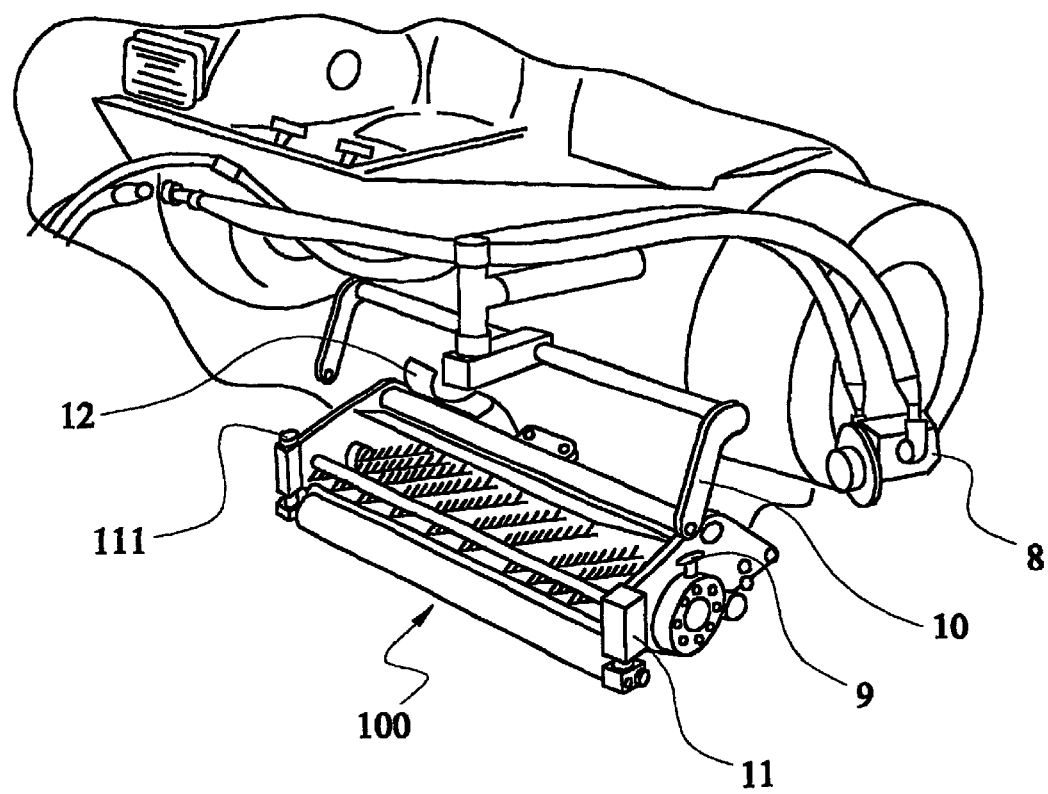
FIG. 5 is a perspective view of the structure used to replaceably mount a modular unit to the type (B) grass treatment machine of FIG. 3.
Figure 4:
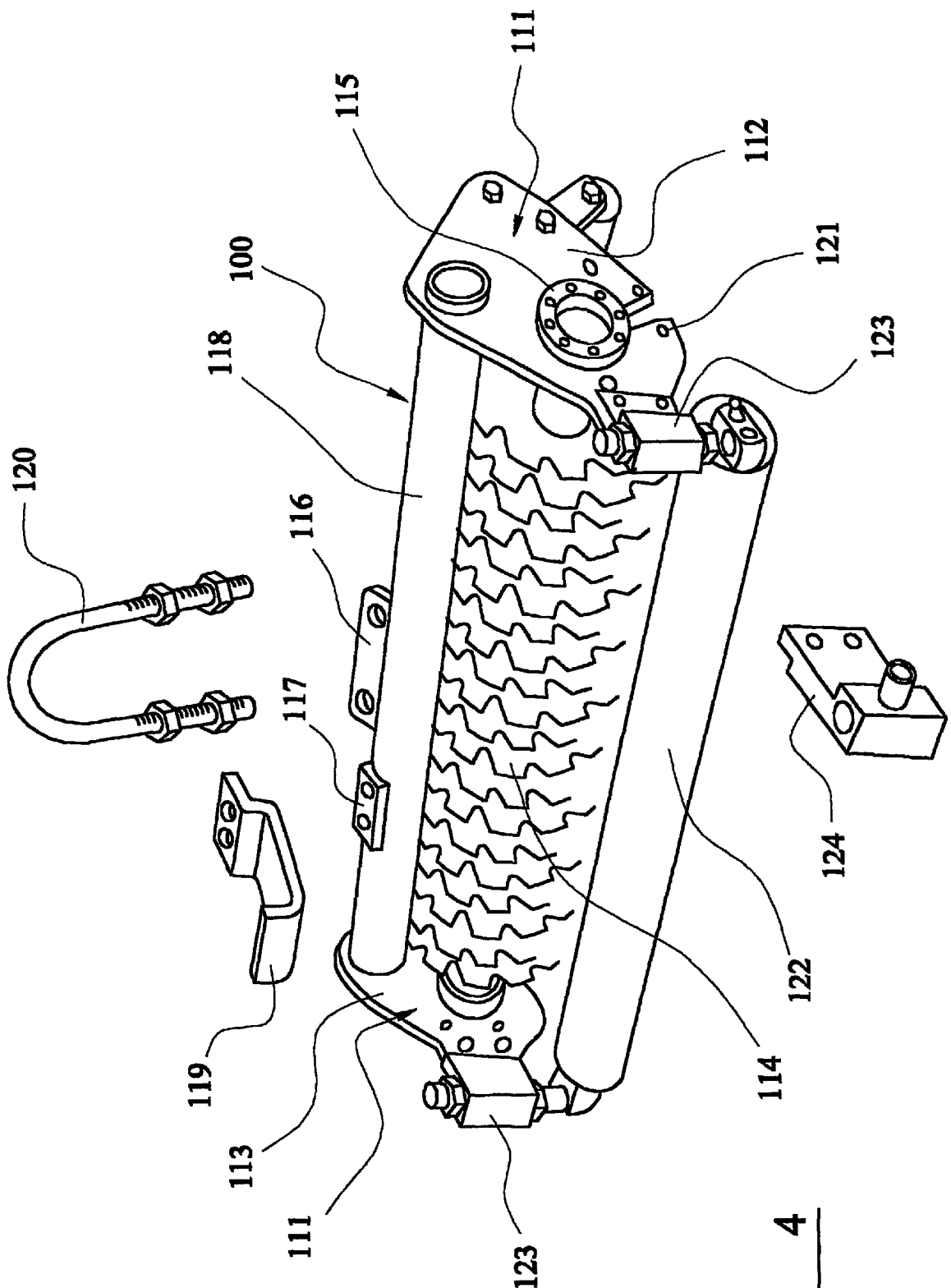
FIG. 4 is an exploded perspective view of a modular unit for mounting on a grass treatment machine within the scope of the invention.

Referring to FIGS. 4 and 5 of the drawing, a modular unit according to the invention is designated generally by reference 100, and is intended to be mounted on a self-propelled grass treatment machine (not shown). The grass treatment machine will usually be of the type designed for large scale use (such as machines A and B described above), and will have a number of separate grass treatment units mounted thereon, so that a large area of grass can be "treated" during each pass of the machine.

Examples of grass treatment machine to which the modular unit of the invention may be applied included so-called "triple mowers". However, the grass treatment machines also may be provided with, or have provision for mounting thereon other types of grass treatment units, such as so called "verticutting" units for removal of thatch; brush units for sweeping up surface debris, and spiker units to aerate the surface.

Bearing in mind that a golf club operator may utilise several different grass treatment machines of various makes or models, the selection of units they may need to purchase over the years may be considerable.

Besides mowing of grass, the next most common operation carried out using units fitted to grass treatment machines is so-called "verticutting", which is an operation which removes "thatch" i.e. dead organic matter, by cutting in between the blades of grass with a series of cutting blades rotating in generally vertical planes.

Verticutting units are therefore the most popular additional units/modules sold for fitting onto grass treatment machines, and a preferred embodiment of the invention therefore uses a verticutting unit/module as its basic mode. The verticutting mechanism of the preferred embodiment may, however, be easily removed from the frame of the module unit, and an alternative type of grass treatment mechanism fitted in its place.

The preferred embodiment disclosed herein is by way of example only, and exemplifies one way in which a totally new concept of a "universal" unit can be designed, and which can be adapted by simply exchanging various fitting brackets to fit all common makes of grass treatment machine, and specifically for the illustrated embodiment a greens triple mower.

Therefore, the invention provides a modular unit which can be mounted on at least two different designs of self-propelled grass treatment machine, and in which each machine has a main frame provided with a number of mounting locations for mounting respective modular units, and in which the mounting locations of one machine are different in design or type from the mounting locations on the other machine.

Further, the modular unit 100 is operative to carry out a required grass treatment action when mounted in position, and in the case of the unit 100 this will be a thatch removal operation.

The modular unit 100 comprises a general frame or chassis designated generally by reference 111, and which includes end frame plates 112, 113 transversely spaced with respect to the direction of forward travel of the machine.

Mountings 115 are provided on the end frame plates 112 and 113, and which allow a rotatable grass-treatment device, designated generally by reference 114, to be mounted on the frame of the modular unit. The device 114 has a drive shaft (not shown in detail) mounted at each end in the rotatable mountings 115 in the end plates 112, 113, and means is provided (not shown) to apply drive to the shaft. In the illustrated arrangement, a universal mounting flange 115 is provided on end plate 112, and which serves to mount a hydraulic motor which will receive an energy supply from the machine, so as to rotate the treatment device 114.

Because of the variety of different methods used by different manufacturers for attaching the hydraulic motors to their cutting units, mounting flange 115 is equipped with a series of tapped holes into which may be fitted a variety of studs of different diameters, and at different spacings, and onto which may be attached further specialised mounting flange adaptors if required, to fit specific applications.

The end plate 113 may also be provided with a similar mounting flange 115 if required, to allow the modular unit to be driven from either end.

The grass treatment device 114 may comprise a simple mowing cylinder, or may comprise a verticutter, having horizontally spaced cutter units, as shown schematically in the drawings. Alternatively, the device 114 may comprise a spiker or brush, or other type of grass treatment device.

The grass treatment device 114 can readily be removed, and replaced with a different type of grass treatment device. End plates 112 and 113 may incorporate a slot to facilitate removal and replacement of rotatable mountings 115 when changing grass treatment devices.

To allow the modular unit 100 to be mounted on at least two different designs of grass treatment machine, at least two different types and/or arrangements of mounting brackets may be attached to the points provided on the frame 111 of the modular unit 100.

In the illustrated arrangement, two different mounting 116 and 117 are shown, having different arrangements of mounting holes, and also different locations along the length of the mounting arm 118 of the frame 111.

A kit of components may also be provided with each modular unit, and including different brackets 119 and U-shaped clamping fittings/brackets 120 as shown, to fit different makes and models of greens triple mowers and other grass treatment machines from the same or different manufacturers.

One or more of the end frame plates 112, 113 may have additional mounting holes 121, as shown for end plate 112, which may be used for fitting other mechanisms onto the same chassis.

Furthermore, a front mounted roller 122 (which may also be used to adjust the working height of the machine) mounted on the general frame of the modular unit 100 via adjustment mounting blocks 123, and different front roller mounting brackets 124 may be provided, as shown, incorporating different fittings required for various makes and models.

Figure 1:
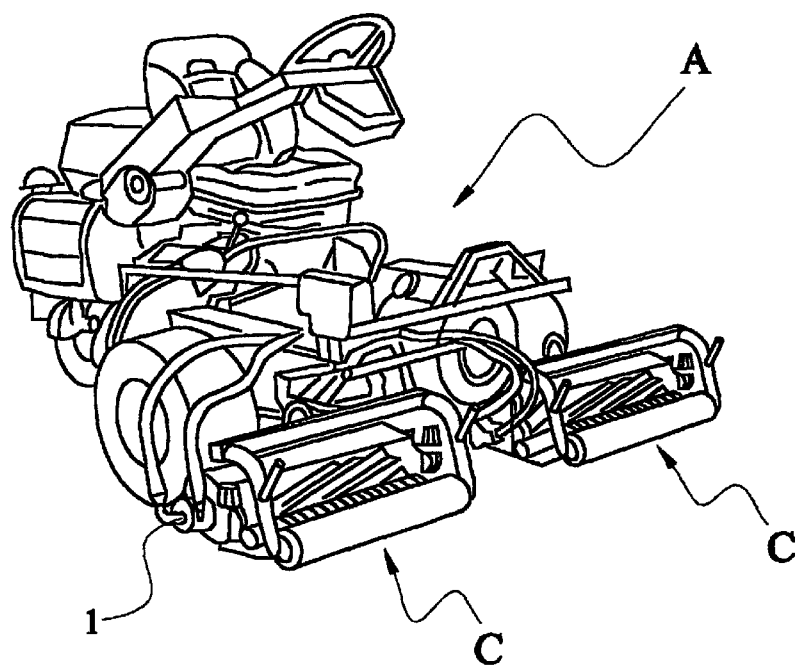
FIG. 1 is a perspective view of a typical type (A) grass treatment machine to which the invention may be applied.
Figure 2:
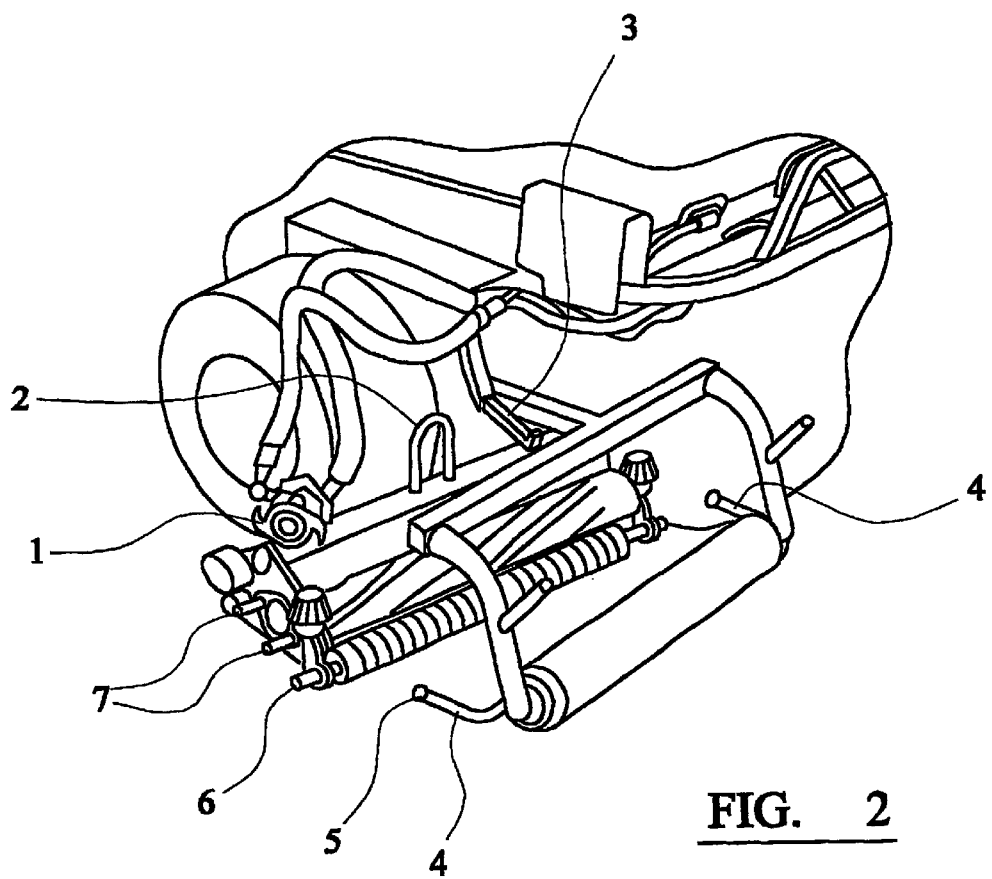
FIG. 2 is an enlarged perspective view of the structure used to attach a cutting unit to the type (A) grass treatment machine of FIG. 1.
Figure 3:
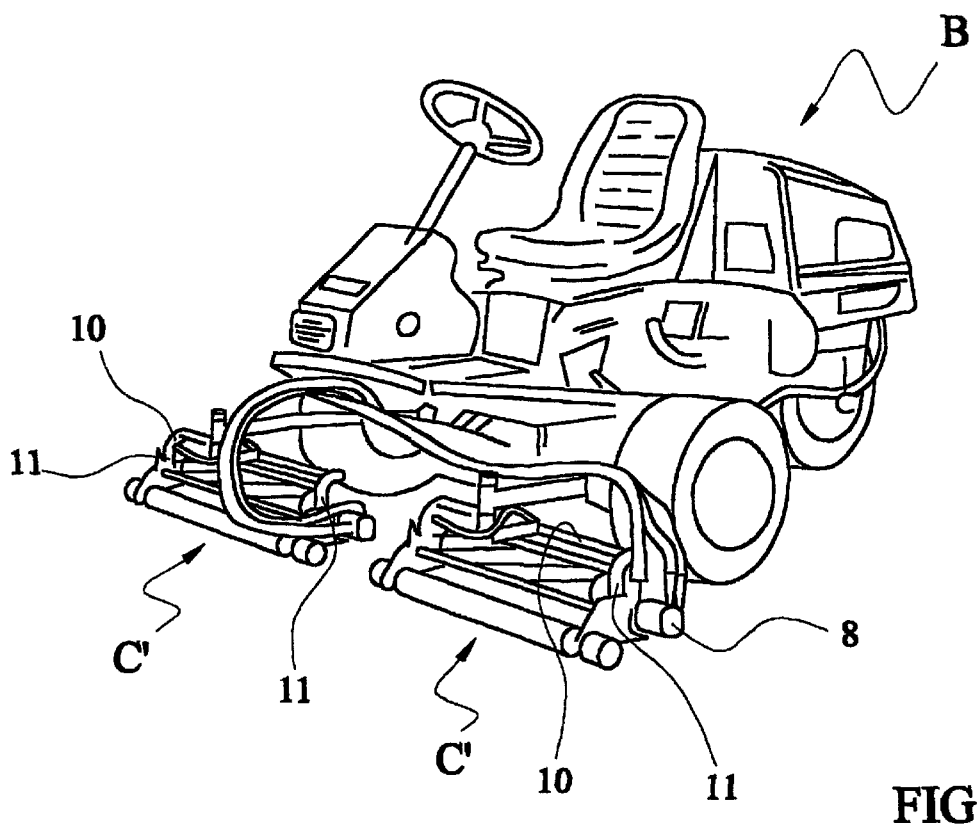
FIG. 3 is a perspective view of a typical type (B) grass treatment machine to which the invention may be applied.

FIG. 5 illustrates how modular unit 100 may be replaceably mounted on pull frame 10 of machine B (shown in FIG. 3) via mounting points 111, in order to replace existing cutter unit C'. Hydraulic motor 8 is attached to said modular unit 100 via quick release pin 9.

FIGS. 6 to 12 illustrate cutting units for still further existing designs of golf green triple mower, and which may be provided by a modular unit according to the invention.

Thus, despite the fact that golf green triple mowers usually have a cutting width of approximately 22" per unit, the actual design of such units varies considerably from one manufacturer to another, and even between different models from the same manufacturer. Such variations include not only the design of the internal mechanism, but also the external fittings for mounting the unit to the main-frame and the grass collecting box onto the unit. Also, whilst the 22" cutting width remains relatively standard, the physical width of such cutting units and grass boxes can be quite varied.

A replacement modular unit according to the invention overcomes all these difficulties by using a carefully selected width of unit equipped with multiple mounting points for the various brackets necessary to connect it to the various manufacturers main-frames and grass boxes.

The area towards the front of each side plate is commonly used by manufacturers for locating mounting points, but as the front roller height adjustment mechanism is also located in this area, a design of front roller height adjustment brackets which also may incorporate a set of mounting points has been developed in a preferred embodiment of the invention, which can be interchanged to facilitate the fitting of such units to different models of main-frame.

Figure 6:
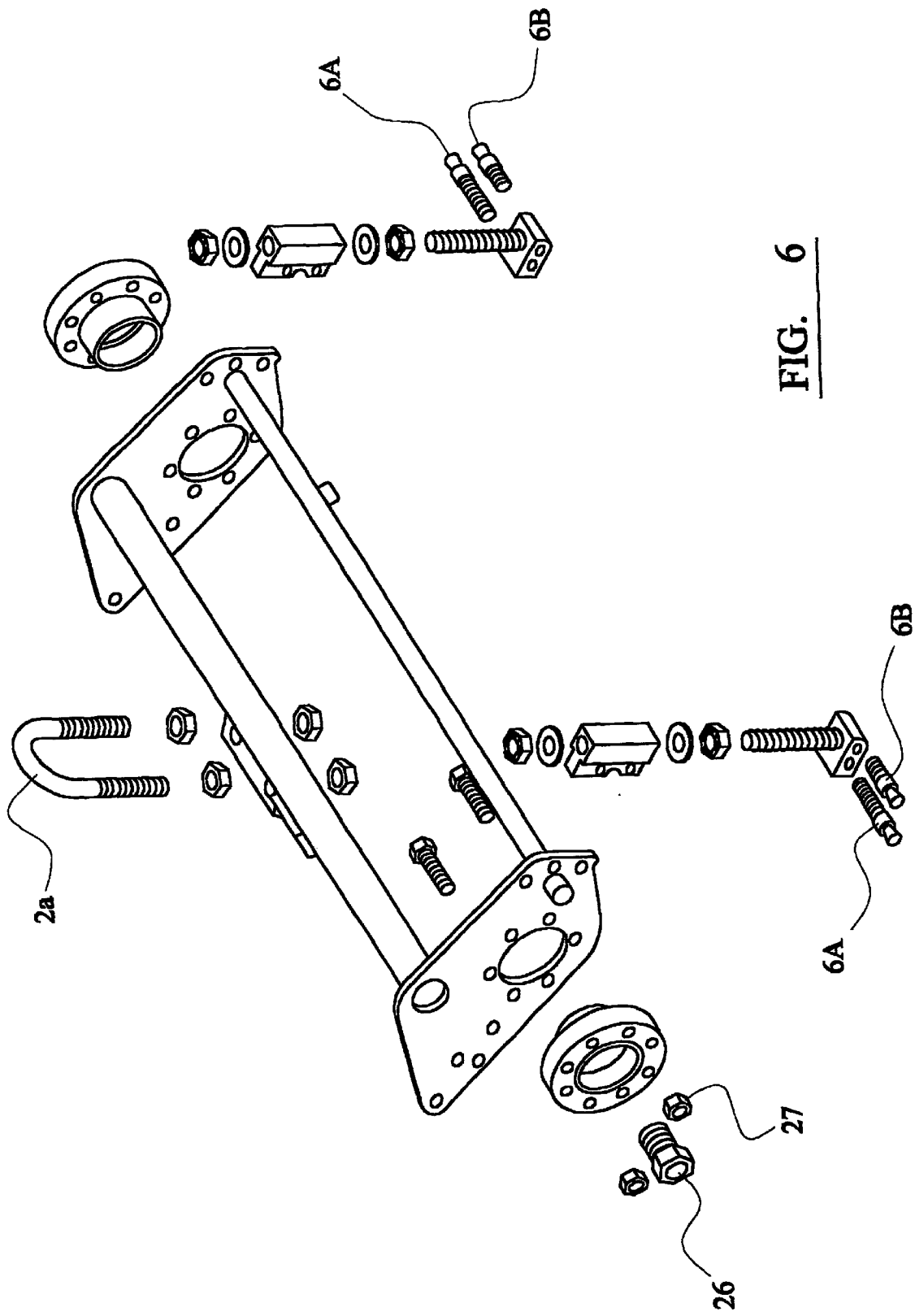
FIG. 6 is an exploded perspective view of a modular unit for mounting on a grass treatment machine that uses a lifting loop and a pair of ball connectors

Illustrations of some of the fittings developed to date follow:

FIG. 6—manufacturer A uses a lifting loop 2*a* and a pair of ball connectors. However, different models of this machine have ball connectors in different positions, spaced at different widths apart, so two mounting positions, and lengths of ball connector 6A and 6B are provided. The hydraulic motors for all these models are fitted with two threaded studs with nuts 27 to the right-hand rotatable mounting 15. Drive to the cutting mechanism is transmitted via a female splined coupler 26.

Figure 7:
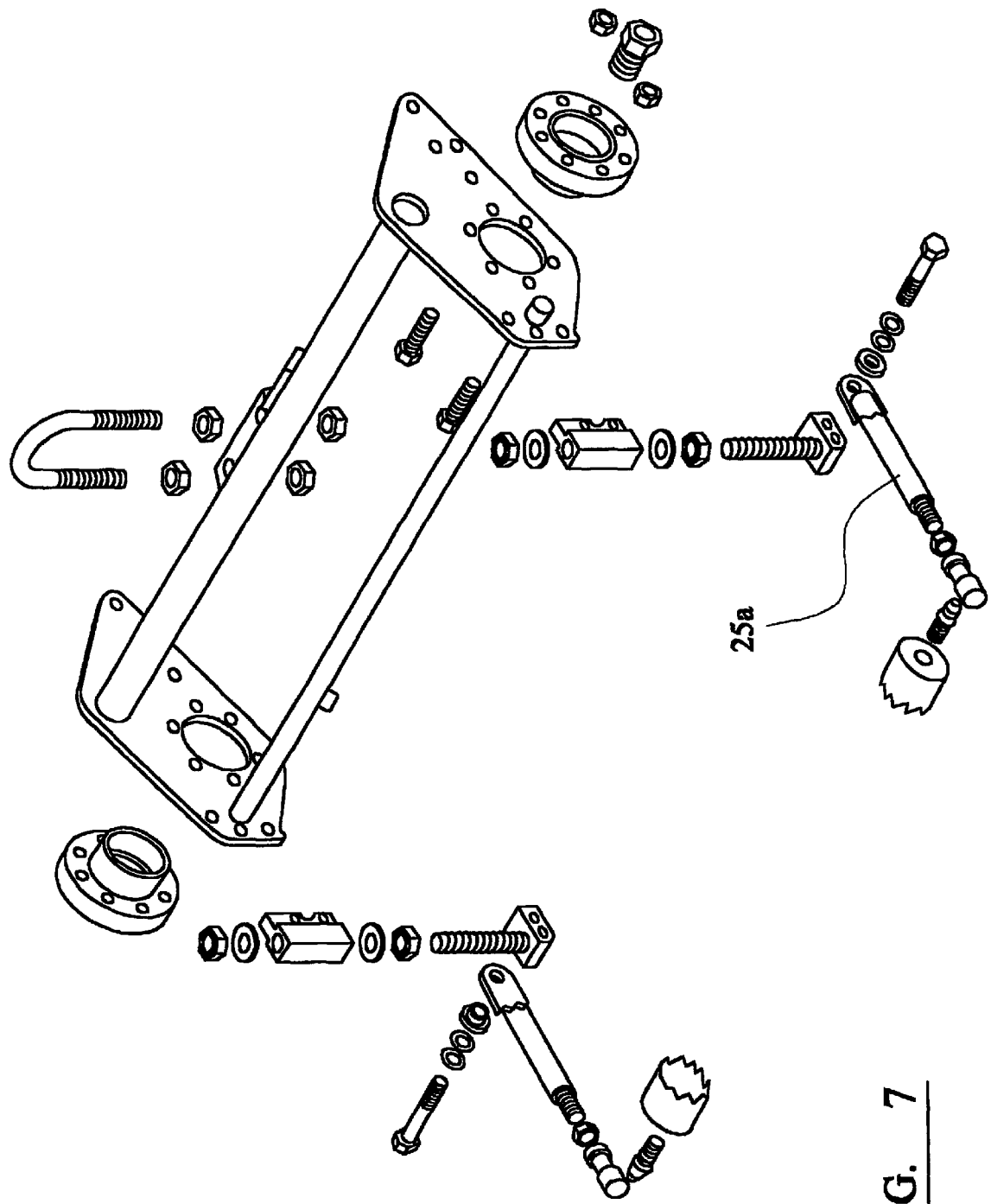
FIG. 7 is an exploded perspective view of a modular unit for mounting on a grass treatment machine that uses a pair of pull arms.

FIG. 7—manufacturer A also produces a similar but different model which requires a pair of pull arms 25*a* to be fitted to the unit and this model has two units with the hydraulic motors mounted on the left-hand end and one on the right.

Figure 8:
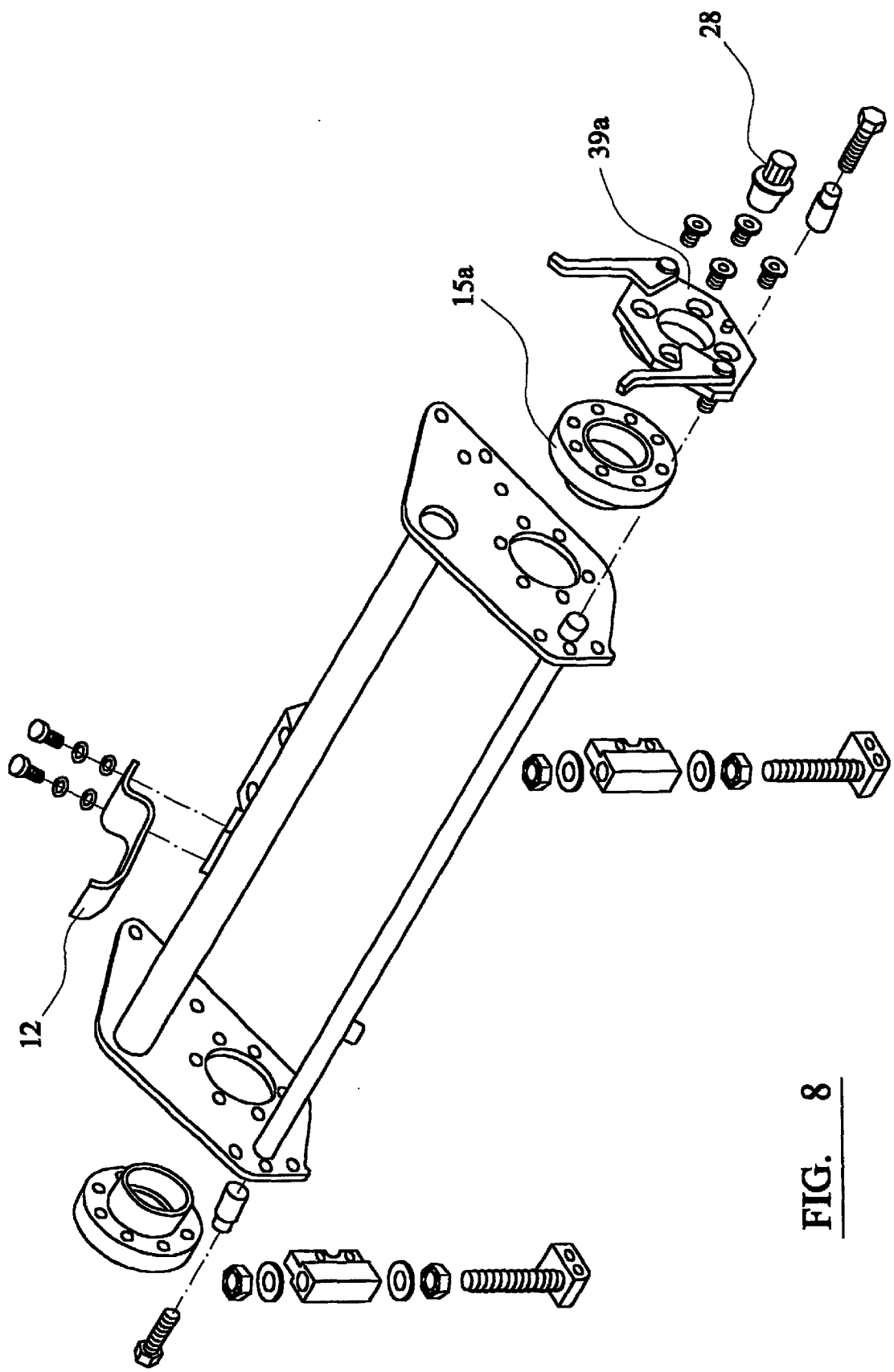
FIG. 8 is an exploded perspective view of a modular unit for mounting on a grass treatment machine having a pair of locking cam levers that are bolted onto a rotatable mounting.

FIG. 8—manufacturer B currently uses a single locking pin to attach its hydraulic motors to rotatable mounting 15*a*, all of which fit on the left-hand end of the cuttings units. However, this has proved to be prone to wear so an alternative clamp 39*a* has been developed with a pair of locking cam levers and this can be simply bolted onto the rotatable mounting 15*a*. Manufacturer B uses a pull-frame 10 (FIG. 5) and lifting hook 12 to attach the unit to the main frame, and a male splined drive coupler 28 to transmit power the cutting mechanism.

Figure 9:
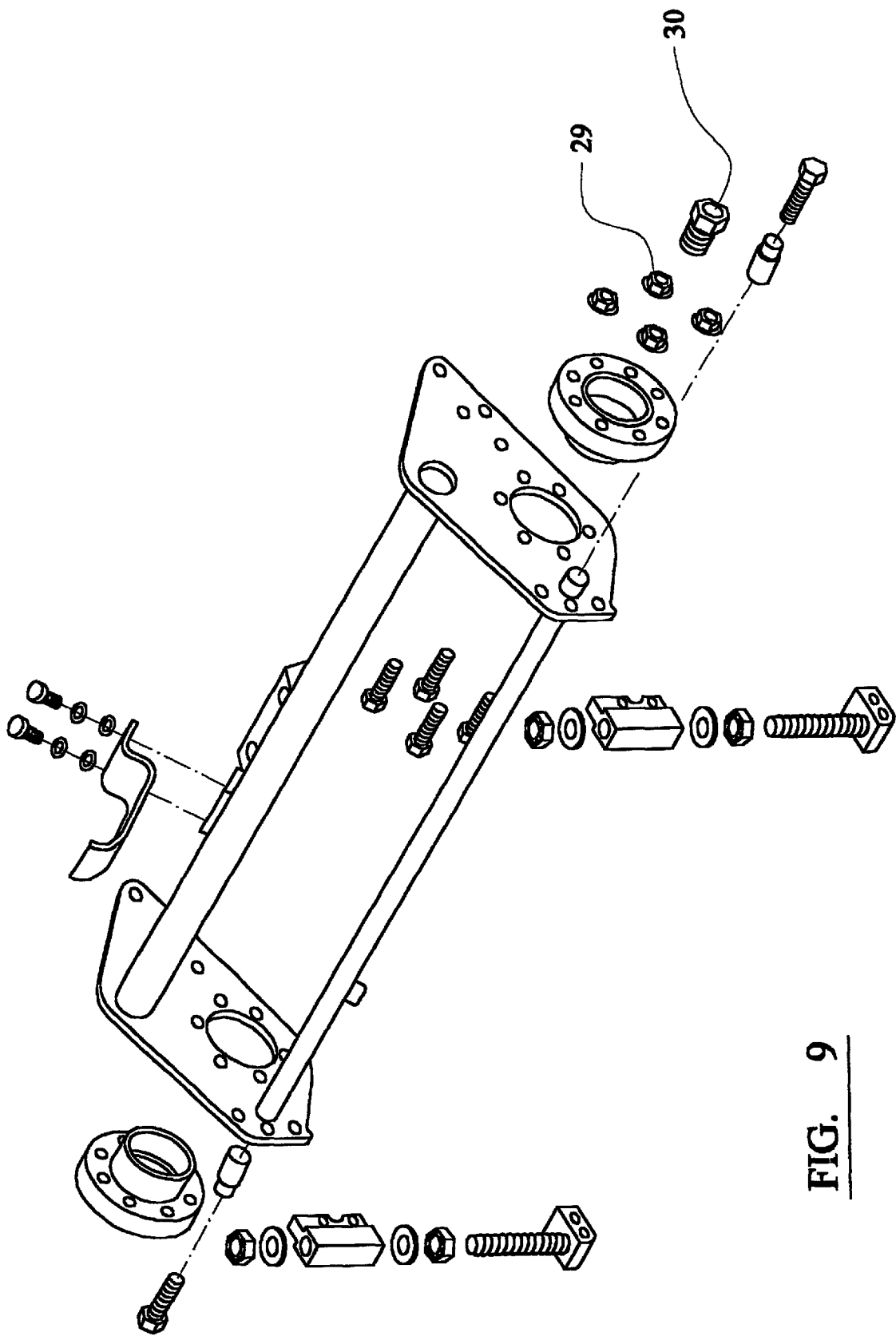
FIG. 9 is an exploded perspective view of a modular unit for mounting on a grass treatment machine having two or four mounting studs with nuts and a female splined drive coupler.

FIG. 9—manufacturer B also still produces an earlier model which has two hydraulic motors fitted on the left-hand end of the units, and one on the right. These can have either two or four mounting studs with nuts 29. A female splined drive coupler 30 is used to transmit power to the cutting mechanism.

Figure 10:
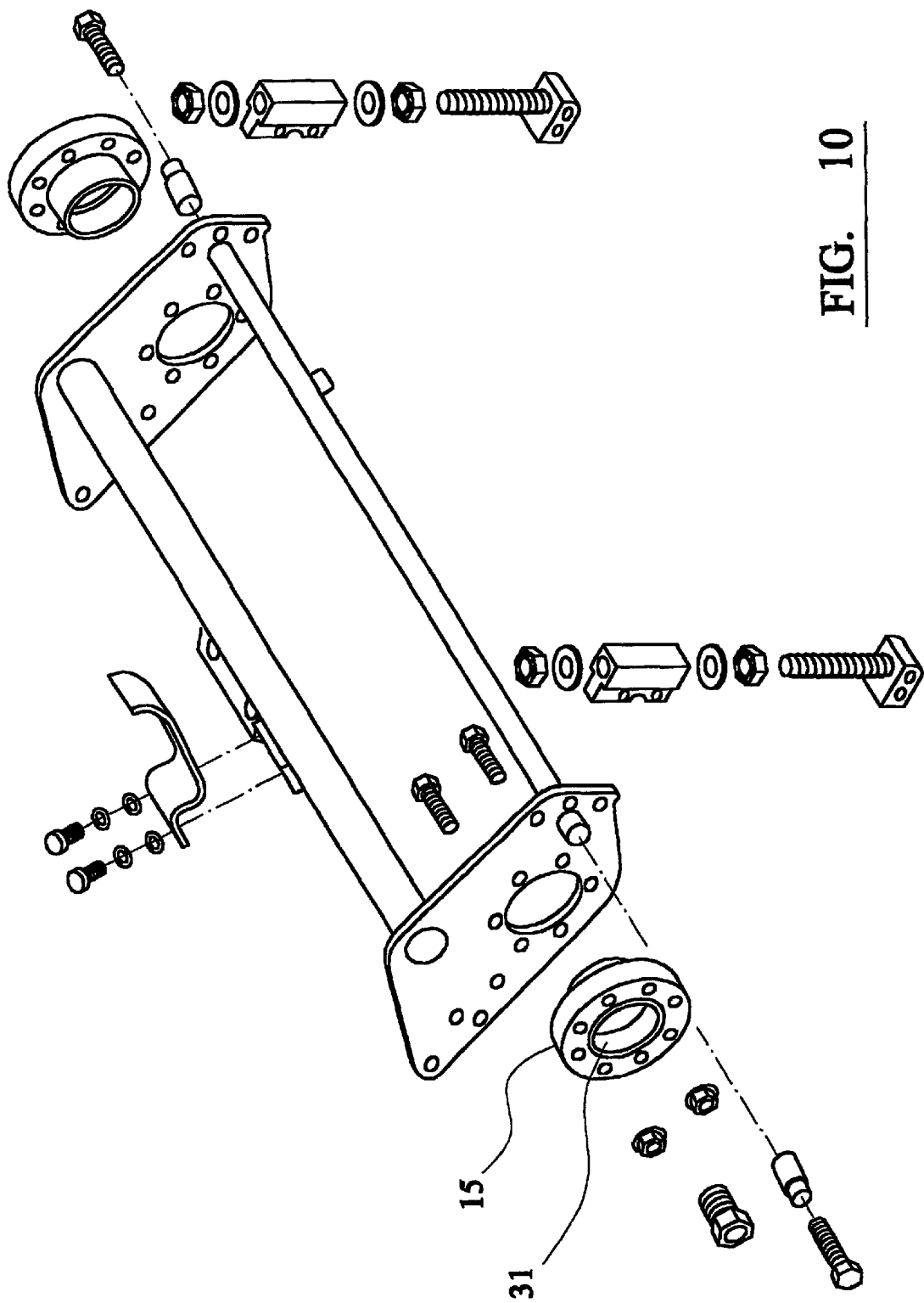
FIG. 10 is an exploded perspective view of a modular unit for mounting on a grass treatment machine having two or four mounting studs and a removable adapter collar to facilitate use with different diameters of hydraulic motor locating collars.

FIG. 10—manufacturer C uses a very similar arrangement to that used by manufacturer B in FIG. 9, again with either two or four mounting studs. However, manufacturer C uses two different diameters of locating collar on its two and four stud mounting hydraulic motors, which necessitates removing an adapter collar 31, from rotatable mounting 15, to locate the larger diameter of the two hydraulic motor locating collars.

Figure 11:
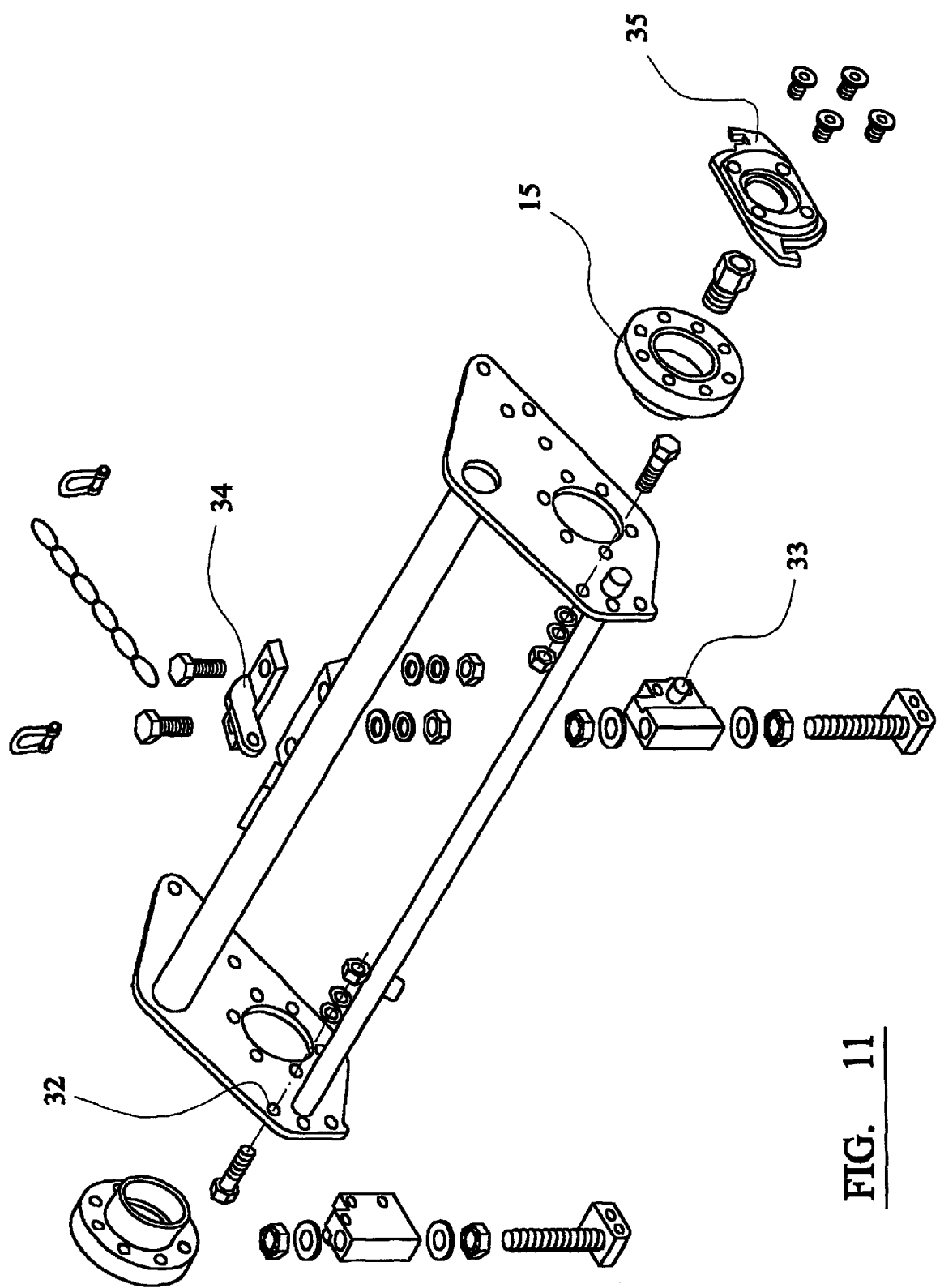
FIG. 11 is an exploded perspective view of a modular unit for mounting on a grass treatment machine that uses a different type of mounting flange fitted to a rotatable mounting and uses a pull-frame bolted to the modular unit.

FIG. 11—manufacturer D uses a pull-frame somewhat similar to 10 (FIG. 5) to mount its units to its main-frame and this is bolted onto the invention through hole 32. The front roller height adjustment brackets for this model incorporate a locating hole 33 to attach the grass box carrier to. A lifting bracket 34 is fitted via two of the holes on the frame mounting arm. A different type of mounting flange 35 is fitted to rotatable mounting 15 to locate the hydraulic motor.

FIG. 12—to fit an earlier model from manufacturer D, lifting bracket 36 is used which is the same article 34 (FIG. 11) except rotated 180°; ie a different arrangement of the same bracket. A different design of front roller height adjusting bracket 37 is used which incorporates a tapped hole 38 which mounts both the pull frame and the grass box

What is claimed is:

1. A modular unit for mounting on at least two different designs of self-propelled grass treatment machines each machine having a main frame provided with a number of mounting locations for mounting respective modular units and in which the mounting locations of one machine are different in type or design from the mounting locations on the other machine, and in which the modular unit is operative to carry out a required grass treatment action when mounted in position and which comprises:

a frame having end frame plates spaced apart from each other transversely with respect to the direction of forward travel of the machine;

rotatable mountings provided on the end frame plates;

a rotatable grass-treatment device having a drive shaft extending between said rotatable mountings, and provided with working elements arranged along the length of said grass-treatment device;

means for applying drive to said shaft; and mounting points provided on the frame of the modular unit to accept at least two different types or arrangements of fitting brackets that will permit the modular unit to be mounted on said at least two different designs of grass treatment machines.

2. A modular unit according to claim 1, in which the mounting points provided on the frame of the unit are arranged along a support, and having at least one of a plurality of different types or arrangements of mounting bracket arranged along its length and designed for use with a specific type of self-propelled grass treatment machine.

3. A modular unit according to claim 2, in which said mounting points are formed by fitting plates or brackets, provided with suitable mounting holes.

4. A modular unit according to claim 1, wherein the means for applying drive to said shaft comprise a mounting flange provided on at least one of the end plates, to allow a suitable drive unit to be coupled therewith.

5. A modular unit according to claim 4, in which a "universal" mounting flange is provided on at least one of the end frame plates.

6. A modular unit according to claim 1, including an additional adapter kit provided with the modular unit, to allow adaptation to suit still further different types of grass treatment machine.

7. A modular unit according to claim 1, and designed to carry out any one of mowing, removal of thatch, brushing or spiking.

8. (currently amended) A modular unit according to claim 7, in which the working mechanism of the unit applicable to the particular type of grass treatment required is itself removable from the frame, to enable a different type of mechanism to be fitted in its place.

9. A modular unit according to claim 1, including a front mounted transversely extending roller, the mounting of which is obtained by provision of different front roller mounting brackets, incorporating different fittings required for various makes/models for which the modular unit is intended.

10. A modular unit as claimed in claim 9, in which said roller mounting brackets include a mounting formation allowing a grass box to be mounted on the unit.

11. A modular unit according to claim 3, wherein the means for applying drive to said shaft comprise a mounting flange provided on at least one of the end plates, to allow a suitable drive unit to be coupled therewith.

12. A modular unit according to claim 11 in which a "universal" mounting flange is provided on at least one of the end frame plates.

13. A modular unit according to claim 12, including an additional adapter kit provided with the modular unit, to allow adaptation to suit still further different types of grass treatment machine.

14. A modular unit according to claim 13, and designed to carry out any one of mowing, removal of thatch, brushing or spiking.

15. A modular unit according to claim 14, in which the working mechanism of the unit applicable to the particular type of grass treatment required is itself removable from the frame, to enable a different type of mechanism to be fitted in its place.

16. A modular unit according to claim 15, including a front mounted transversely extending roller, the mounting of which is obtained by provision of different front roller mounting brackets, incorporating different fittings required for various makes/models for which the modular unit is intended.

17. A modular unit as claimed in claim 16, in which said roller mounting brackets include a mounting formation allowing a grass box to be mounted on the unit.

18. A modular unit according to claim 5, including an additional adapter kit provided with the modular unit, to allow adaptation to suit still further different types of grass treatment machine.

19. A modular unit according to claim 6, and designed to carry out any one of mowing, removal of thatch, brushing or spiking.

20. A modular unit according to claim 8, including a front mounted transversely extending roller, the mounting of which is obtained by provision of different front roller mounting brackets, incorporating different fittings required for various makes/models for which the modular unit is intended.

* * * * *